Figure 1:
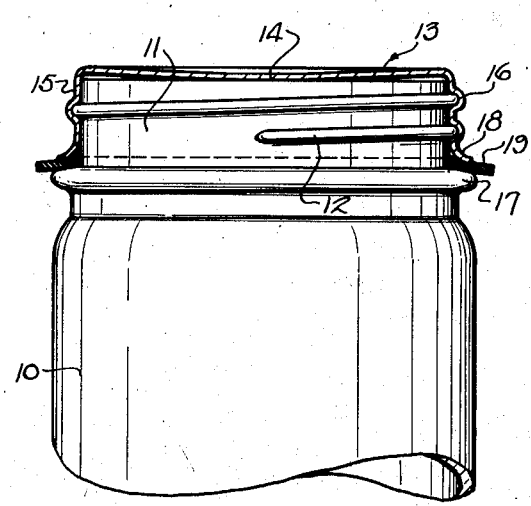

May 8, 1945.  J. D. RYAN  2,375,388

PLASTIC COMPOSITIONS AND ARTICLES MADE THEREFROM

Filed Aug. 5, 1942

Inventor
JOSEPH D. RYAN,
By
Frank Fraser
Attorney

Patented May 8, 1945

2,375,388

UNITED STATES PATENT OFFICE 2,375,388

PLASTIC COMPOSITIONS AND ARTICLES MADE THEREFROM

Joseph D. Ryan, Toledo, Ohio, assignor to Libbey-Owens-Ford Glass Company, Toledo, Ohio, a corporation of Ohio Application August 5, 1942, Serial No. 453,616

4 Claims. (Cl. 288—8)

The present invention relates broadly to new compositions of matter, methods of preparing the same, and articles made therefrom. More particularly, it relates to improved thermoplastic compositions prepared from resinous materials.

Although the thermoplastic materials of this invention are not restricted to any particular use or uses, they are of especial utility when employed as rubber substitutes. One practical application of the materials of this invention is in the manufacture of gaskets or rings useful in obtaining a tight joint or seal between two parts. A more specific application is in the making of so-called "rubbers" or gaskets commonly employed in the sealing of closures upon containers used in both the commercial and home packing of foods.

Heretofore, the gaskets employed for sealing these and other containers have been made of rubber or from rubber compositions. As is well known, rubber differs greatly from thermoplastic materials in that it does not tend to flow under the heat and pressures used in the packing of foods and also that seals made using rubber gaskets depend for their effectiveness upon relatively slight displacement or compression of the rubber. Further, that rubber has extremely poor adhesion to glass so that in order to effectively seal glass containers using rubber gaskets, relatively high pressures must be applied to the gaskets during the sealing operation. Moreover, at the present time, the manufacture of rubber gaskets has been seriously curtailed due to the scarcity of rubber and the large requirements therefor in the production of war materials.

It is an aim of this invention to provide new and improved compositions of matter which can be used in the manufacture of gaskets and successfully employed as a substitute for rubber gaskets and in which no rubber, either natural or synthetic, is required. Not only will the use of gaskets of my improved materials release the rubber heretofore employed for this purpose for more essential war requirements but, in addition, I have found that gaskets made in accordance with my invention possess numerous advantages over the use of rubber gaskets.

For instance, the improved thermoplastic materials of my invention are advantageous in that they will undergo thermoplastic "flow" at elevated temperatures with the application of a relatively low pressure so that they become molded to the contour of the container and closure therefor to give a highly effective seal. The fact that the materials "flow" and mold themselves to the surfaces of the container and closure means that the seal extends over a relatively large area as contrasted with the use of rubber gaskets in which a seal is formed only over the relatively small area where they are compressed.

In addition to the above advantages, the materials of my invention possess excellent adhesion to glass and metal and are elastic to a relatively high degree at the temperature employed in the packing of foods. The materials of this invention are further characterized by the properties of toughness and high tensile strength. Sealing gaskets formed from my improved materials also do not tend to crack or become brittle in use nor are they adversely affected by atmospheric changes. Moreover, they have been found to be non-deleterious to foods packed in such containers as well as non-poisonous to the consumer. Furthermore, the materials of the present invention do not lose their desirable properties over the range of temperatures normally encountered in the handling, shipment and storage of foods packed in such containers, which is usually from about 20° F. to 150° F.

Figure 2:
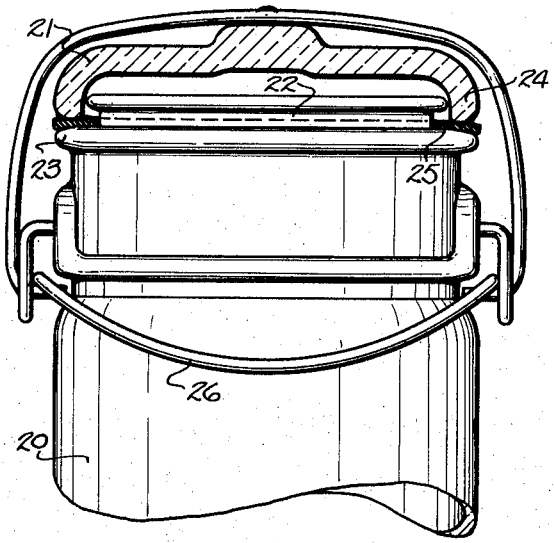
Figure 3:
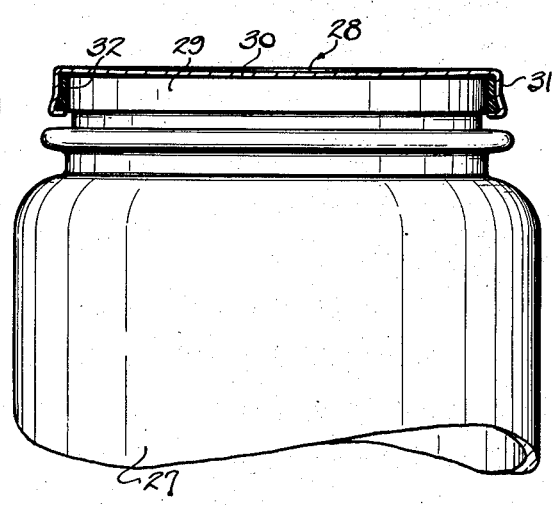
Figure 4:
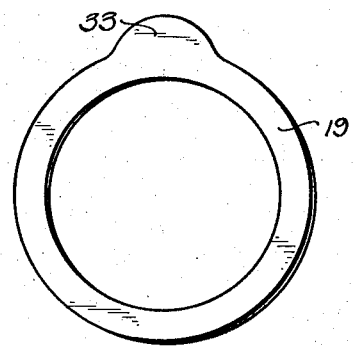
Figure 5:
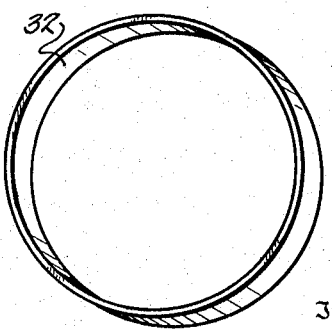

In Figs. 1, 2 and 3 of the accompanying drawing are illustrated three typical types of glass containers and closures therefor with which gaskets formed of the materials of this invention may be employed, while in Figs. 4 and 5 are shown two different types of gaskets. It is to be expressly understood, however, that the gaskets of my invention are not restricted to use with the particular types of containers shown but that they may, in general, be used wherever rubber or rubber composition gaskets have been employed in the past.

With reference now to the drawing and particularly to Fig. 1, there is disclosed a portion of one well known type of glass container used in the packing of foods and comprising a body 10 closed at its bottom end open at the top thereof. Provided at the open top of the body is an upstanding annular rim 11 screw-threaded as at 12 to receive the closure 13. The closure 13 consists of a metal cap having a top 14 and an integral depending annular skirt 15 also screw-threaded as at 16 for engagement with the threads 12 on an annular rim 11. The body 10 of the container is also provided at the base of rim 11 with a substantially horizontal annular shoulder 17, while the skirt 15 of metal cap 13 is provided at its lower edge with an outwardly turned or rolled flange 18 adapted to coact with shoulder 17. When securing the cap 13 upon body 10, a so-called "rubber" or gasket 19 (Fig. 4) is first placed upon the shoulder 17 and the cap 13 then screwed down tightly over the rim 11 until the flange 18 of said cap acts to firmly compress the gasket against the shoulder 17 to hermetically seal the joint therebetween.

In Fig. 2 is illustrated another type of container including a glass body 20 and glass closure 21. The body 20 is provided at its upper end with an upstanding annular rim 22 and a substantially horizontal shoulder 23 upon which the downwardly curved edge portion 24 of the closure rests. Interposed between the shoulder 23 and edge portion 24 of the closure 21 is a "rubber" or gasket 25. In this type of container, the closure 21 is secured to the body 20 by means of the well known bail clamp 26 which, upon being tightened, causes the closure 21 to compress gasket 25 upon shoulder 23 to form a hermetic seal.

In Fig. 3 is illustrated still another type of container comprising a glass body 27 and a metal closure 28. Provided at the upper end of the body 27 is an upstanding annular rim 29 for receiving the closure 28. The closure 28 comprises a cap having a top 30 formed with an integral depending annular skirt 31 which fits downwardly over the upper end of rim 29 and is spaced slightly therefrom. Fitted within the skirt 31 of the closure and preferably secured thereto is the "rubber" or gasket 32 (Fig. 5). In this container, the closure 28 is secured upon the body 27 by pressure which compresses the gasket 32 over the rim 29 of the body 27 and results in frictional sealing engagement therewith.

The gasket 19 shown in Fig. 4 is usually termed a horizontal type gasket and the gasket 32 in Fig. 5 a vertical type gasket. Gasket 19 can be stamped or cut from flat sheets of material formed in accordance with my invention, while gasket 32 can be suitably cut from preformed tubing. Obviously, other types of gaskets can be formed from the thermoplastic materials of my invention and can likewise be used in connection with various other types of containers or jars. The drawings are merely intended to show typical types of containers and gaskets used in the commercial and home packing of foods and are in no way limitations upon the invention.

Broadly stated, the gaskets of the present invention are formed of thermoplastic materials comprising a resinous base, particularly a polyvinyl acetal resin, a compatible plasticizer therefor and a suitable filler or combination of fillers compounded with one another to provide a homogeneous composition.

As is well understood in the art, polyvinyl acetal resins are made by reacting partially or wholly hydrolyzed polyvinyl esters with an aldehyde. As examples of polyvinyl esters among others which may be employed as starting materials are polyvinyl acetate, polyvinyl propionate, and polyvinyl butyrate. Examples of aldehydes that may be reacted with the partially or wholly hydrolyzed polyvinyl esters are formaldehyde, acetaldehyde, butyraldehyde, propionaldehyde, hexaldehyde, etc. Aromatic aldehydes, as distinguished from the foregoing aliphatic aldehydes, such as benzaldehyde, are also suitable.

I have found, however, that not all polyvinyl acetal resins are suitable for making gasketing materials in accordance with my invention. More particularly, I have found that polyvinyl acetal resins suitable for carrying out the invention are those in which at least 60% of the available hydroxyl groups of the partially or wholly hydrolyzed polyvinyl ester are reacted with the aldehyde. For example, one polyvinyl acetal resin found suitable in carrying out my invention is of the formaldehyde type and is sold under the trade-name "Formvar." The characteristics of such a resin are described below.

Polyvinyl acetate having a viscosity of at least 7 centipoises in molar benzene solution at 20° C. was hydrolyzed in acid solution to the extent of about 95%. This partially hydrolyzed polyvinyl acetate was then reacted with formaldehyde in the presence of a suitable acid catalyst in water solution so that approximately 85% to 90% of the hydroxyl groups present in the molecule were condensed with the aldehyde. An actual analysis of the resin showed:

| | Per cent |
|---|---|
| Vinyl formal groups, calculated as polyvinyl formal | 79.5 |
| Vinyl acetate groups, calculated as polyvinyl acetate | 11 |
| Vinyl alcohol groups, calculated as polyvinyl alcohol | 9.5 |

Another polyvinyl acetal resin suitable for carrying out my invention is that made by reacting acetaldehyde with partially or wholly hydrolyzed polyvinyl acetate; such resins being sold under the trade-name of "Alvar." These resins are made by hydrolyzing polyvinyl acetate having at least the viscosity of 7 centipoises when measured in a molar benzene solution of 20° C. with acetaldehyde in the presence of an acid catalyst. A typical analysis of such a resin is given below:

| | Per cent |
|---|---|
| Vinyl acetate groups, calculated polyvinyl acetate | 8.0 |
| Vinyl alcohol groups, calculated as polyvinyl alcohol | 13.0 |
| Vinyl acetal groups, calculated as polyvinyl acetal | 78.0 |

Still another polyvinyl acetal resin suitable for carrying out my invention is a polyvinyl butyracetal resin variously known in the trade as "Butacite," "Butvar" and "Vinylite-X." These resins are made by reacting polyvinyl alcohol prepared by wholly hydrolyzing a polyvinyl acetate having a viscosity of at least 7 centipoises in a molar benzene solution at 20° C. with butyraldehyde. It will be understood that wholly hydrolyzed polyvinyl acetate is also known as polyvinyl alcohol and, depending upon the efficacy with which the hydrolysis has been carried out, may contain small amounts of vinyl acetate groups, usually not exceeding 5%. An analysis of a resin of this type which gave excellent results is:

| | Per cent |
|---|---|
| Vinyl acetate groups, calculated as polyvinyl acetate | 1.10 |
| Vinyl alcohol groups, calculated as polyvinyl alcohol | 19.1 |
| Butyr acetal groups, calculated as polyvinyl butyr acetal | 79.5 |

As pointed out above, I have discovered that unless at least 60% of the available hydroxyl groups of the partially or wholly hydrolyzed polyvinyl ester is reacted with the aldehyde, the resins are relatively unsuitable for use in making my gasketing materials. This is due to the fact that the presence of large numbers of hydroxyl groups makes the resin highly water-absorbent, less easy to plasticize, and such resins show poorer compatibility and retentivity for plasticizers. Because of their high water absorption, these high hydroxyl resins tend to hydrolyze and become water-soluble, especially at elevated temperatures.

While three specific types of resins have been set forth above by way of example as being satisfactory for use in making my improved thermoplastic materials, other polyvinyl acetal resins of the character described have been tried and also found satisfactory.

Plasticizers suitable for carrying out my invention are those which are wholly compatible with the polyvinyl acetal resins described above and which preferably have low vapor pressure, good resistance to hydrolysis, and high boiling points. These factors are important because plasticizers having low boiling points and relatively high vapor pressure tend to evaporate from the gasketing materials, especially under the conditions present in the packing of foods and will tend to contaminate the food inside the containers. Also, since gasket materials must be stored, loss of plasticizer means changes in properties in the gasketing materials which of course would be undesirable. Good resistance to hydrolysis is imperative inasmuch as practically all packing of foods is done in a water medium and if the plasticizer hydrolyzes the same effect is obtained as loss of plasticizer through volatility. It is also essential to employ plasticizers which on hydrolysis (assuming that such a reaction might take place to even a minor degree) yield products which if dissolved in the food would not be poisonous to consumers. To illustrate, oxalic acid esters should not be used as a plasticizer if tartrate ester could be employed since the former acid is poisonous whereas the latter is not.

Examples of plasticizers which I have found suitable for use with the polyvinyl formaldehyde type of resin described above are diethyl phthalate, diethyl tartrate, dimethyl sebacate, diethyl adipate, and ethyl levulinate.

Examples of plasticizers which I have found suitable for use with the polyvinyl acetaldehyde acetal type of resins described above are dibutyl sebacate, diethyl sebacate, dibutyl phthalate, diethyl phthalate, dibutyl tartrate, and diethyl suberate.

For plasticizing the polyvinyl butyr acetal resins described above, I found that dibutyl sebacate is an excellent plasticizer. Likewise, dibutyl phthalate, triethylene glycol dihexoate, dibutyl adipate, butyl laurate, dibutyl tartrate, etc., gave excellent results.

As will be obvious to one skilled in the plastic art, a certain amount of judgment must be exercised in selecting a plasticizer to combine with any one of the resins described above but, in general, the plasticizer should be chosen which best conforms with the properties outlined above as desirable; namely, low volatility, high resistance to hydrolysis, etc.

I have found that the most desirable fillers for use in carrying out my invention are those which are in very finely divided form; that is to say, the particle sizes thereof should preferably be comparable to those used in the making of paints. They should also be relatively unreactive materials chemically since packaged foods sometimes contain slight amounts of weak acid, such as the acetic acid of vinegar, and the fillers should not react with organic acids of this type in low concentrations. One type of material which I have found to be extremely satisfactory as a filler is ordinary rouge such as is commonly used in the polishing of glass. This rouge is usually of such fineness that it passes through a standard 325 mesh screen and an analysis thereof showed it contained approximately 94.5% ferric oxide, 4.0% silica, and about 1.5% of calcium, magnesium and aluminum oxides. The rouge not only serves the purpose of a filler but also acts as a pigment and imparts a reddish color to the thermoplastic materials. Other fillers which may also be used are Tennessee ball clay and Lakeland clay of the so-called "air-floated" variety—both of these materials being characterized by a very fine state of subdivision, passing through a 325 mesh screen. I have further found that carbon black, so-called "Gastex," as used in the rubber art, works satisfactorily. Likewise, zinc oxide may be used as a filler in making my gasketing materials where a white sealing ring might be preferred to a red or black one. Zinc oxide which has been ground to the proper state of subdivision is available on the market for the manufacture of paints and should preferably be used in this form.

Other fillers found suitable, when ground to the proper state of subdivision, are talc, magnesium, silicate, diatomaceous earth (sold in the trade as "Celite"), siennas, etc. All of these fillers should pass through a 200 mesh screen and preferably through 325 mesh.

In compounding the thermoplastic materials of the present invention, the resin, in preferably finely divided powder form, is first wetted with a suitable amount of plasticizer by stirring or kneading and the temperature of the mix elevated to effect complete colloidalization of the resin. The mixing may best be accomplished in a kneading machine such as a Banbury mixer or on a pair of rolls such as are used in masticating rubber. At this point, the proper quantity of filler may be added and the mixture heated and kneaded until the filler is thoroughly dispersed throughout the plasticized resin mass and a homogeneous, pliable, plastic mass secured. The plastic mass may then be molded or shaped by any suitable method. For example, the plastic mass may be placed in a mold and converted into block form from which sheets may be skived or cut or it may be calendered into sheet form by passing it through calendering rolls under proper conditions. Also, if desired, the plastic mass at this stage may be fed to an extrusion machine and extruded therefrom in sheets or in tubular form from which rings may be readily cut by suitable cutting means. Instead of starting with powdered resin, plasticized plastic masses may be combined directly with the filler and heated, kneaded, and admixed on malaxating rolls to effect uniform dispersion of the filler. Obviously, there are many variations in compounding and shaping the plastic mass, all well known in the plastic and rubber arts, which may be employed.

Although not necessary, it may be desirable in some cases to add a small amount, say less than 1%, of lubricants to the plastic mass during the mixing operation to prevent sticking of the plastic to the metal parts used either in the molding, calendering, shaping, or extruding equipment. Examples of such mold lubricants are stearic acid, oleic acid, metal stearates, etc.

As will be readily appreciated, the conditions encountered in packing foods vary to a considerable extent depending upon the particular type of food to be packed. To illustrate, in packing corn and beans, they must be heated to a much more elevated temperature for longer periods of time than is the case in packing peaches or other fruits. On the other hand, in packing catsup, chilli sauce, etc., normal room temperatures may be employed using sterile containers. Consequently, the properties of the gasketing materials employed can be and are varied depending upon the particular type of food to be packed. For example, when using gaskets formed of my improved materials in packing fruits or vegetables requiring a relatively low temperature, the composition of the gaskets should be such that they are more readily flowable and compressible than is required when packing fruits or vegetables at a relatively high temperature, say 235° to 250° F. where too great compressibility or flowability of the material would be of decided disadvantage.

By way of illustration, there are set forth below several specific examples of gasketing materials prepared in accordance with my invention:

*Example 1*

100 parts of polyvinyl butyracetal resin of the character described above and 37 parts of dibutyl sebacate were stirred together in a Banbury mixer at room temperature. When the resin particles were wet with the plasticizer, which required only a few minutes, the mix was transferred to heated malaxating rolls having a temperature of 240° F. and milled at this temperature for about 5 to 10 minutes. At this point, the resin was completely colloidalized by the plasticizer and 274 parts of rouge of the type above described was gradually added. As milling upon the rolls took place, the rouge became uniformly dispersed throughout the plastic mass. The time required for this operation will, of course, depend upon the size of the rolls and amount of the batch to be compounded. However, when using a pound batch and malaxating rolls 18 inches in length and 6 inches in diameter, a half hour was required for the dispersion operation. After milling was complete, the plastic mass was converted into sheet form on the malaxating rolls by cooling one of said rolls and thereby causing the sheet to form on the hotter roll as is well understood in the art. The thickness of the sheet can be controlled by adjusting the space between the rolls, and for making standard home packing jar gaskets the sheet was milled to about $\frac{1}{16}$ of an inch in thickness. After formation of the sheet, the rolls were cooled and the sheet cut and removed. Jar rings were then made from the sheet by stamping with punching dies and also by simply cutting rings from the sheet with a pair of shears.

Attention is called at this point to the importance of carrying out a thorough dispersion of the filler during the milling operation. If this is not done, the thermoplastic properties of the sheet will vary from one point to another within the sheet causing difficulty in obtaining a uniform seal. To guard against this, sufficient milling time may be established by running flow tests on portions of the sheet taken from widely separated points. Such a test can be readily carried out in the Tinius-Olsen Flow Tester. This machine has been adopted as a tentative standard for measuring plastic flow by the American Society for Testing Materials and its method of operation need not be described here.

The thermoplastic flow of the material described above was 0.40 inch in the Olsen flow tester using a temperature of 240° F. and a pressure of 200 pounds per square inch for a time period of two minutes.

The rings cut from the sheet above described were used in sealing a metal closure upon a standard Ball Mason jar, of the type shown in Fig. 1, containing distilled water, and the metal closure screwed onto the jar until tight. The closure was then turned back approximately one-quarter turn for venting. The container was then placed in a sterilizer of the autoclave type in which live steam is fed to the autoclave and contacts the container. The temperature was elevated to 235° F. and heating continued for 70 minutes. At the end of this time, the autoclave was cooled to 212° F., the container removed and the closure screwed on tightly to effect a seal between the closure and container. It was then inverted and placed on a desk as is the custom in the home packing art. An excellent seal was obtained which was not broken by considerable handling and abuse. After a considerable period of time, the seal was broken by pulling the tab 33 of the gasket (Fig. 4) and the distilled water then tested for taste, odor, etc., which was found to be unchanged. Distilled water was used in this testing rather than food so that the contaminating effect of the sealing material on the contents of the container would not be confused by other odors or tastes. It was also found that upon removal the gaskets were still tough, pliable and elastic and were unaffected by the temperatures and pressures to which they had been subjected. It was also found that the seal could be readily broken by pulling the tab 33 which forms a part of the design of the standard home packing gasket.

*Example 2*

100 parts of polyvinyl butyr acetal resin, 37 parts of dibutyl sebacate, and 342.5 parts of rouge were compounded in the manner described under Example 1. When tested at a temperature of 235° F. as outlined under the test procedure given in Example 1, a very satisfactory seal was obtained. Also, the material did not have any adverse effect on the distilled water as regards odor or taste.

Flow of this material in the Olsen flow tester at a temperature of 240° F. and a pressure of 200 pounds per square inch for a time period of 2 minutes was 0.34 inch.

*Example 3*

100 parts of polyvinyl butyr acetal, 37 parts of dibutyl sebacate, and 411 parts of rouge were compounded in the manner described under Example 1. This material was also tested as described under Example 1 and an excellent seal obtained. Like the materials of Examples 1 and 2, this material did not deleteriously affect the distilled water used in the testing.

Flow of this material in the Olsen flow tester at 240° F. and 200 pounds per square inch pressure for a time period of two minutes was 0.26 inch.

*Example 4*

100 parts of polyvinyl acetal resin, 37 parts of dibutyl sebacate, 34 parts of Lakeland "air floated" clay, and 230 parts of rouge were compounded in the manner described under Example 1. This material was also tested as described under Example 1, except that the temperature used in the packing test was 250° F. An excellent seal was obtained and the contents of the container were not adversely affected from the standpoint of taste and odor.

The flow of this material in the Olsen flow tester was 0.20 inch at 240° F. and a pressure of 200 pounds per square inch over a two minute period.

*Example 5*

100 parts of butyr acetal resin, 37 parts of dibutyl sebacate, 68.5 parts of Lakeland "air floated" clay, and a 205.5 parts of rouge were compounded in the manner described under Example 1. This material was also tested as described under Example 1 at a temperature of 250° F. and gave a satisfactory seal. It was likewise tested by placing it in an autoclave filled with water in which the container was completely immersed and temperature elevated to 275° F. and maintained for a period of one hour. Sufficient water was left in the autoclave so that the container at 275° F. was completely immersed in water at all times during the operation. Such a test is not characteristic of the conditions met in home packing but more nearly simulates the conditions met with in the commercial packing of foods where the cooking of the contents of the container is carried out with the container completely immersed in the water at temperatures of 250° F. While temperatures as high as 275° F. would probably never be encountered in actual commercial packing, this extreme test was conducted as a safety factor. The gasket material withstood this test satisfactorily and the contents of the container were not contaminated even under such extreme conditions.

Flow of this material in the Olsen flow tester at a temperature of 240° F. and a pressure of 200 pounds per square inch for a period of 2 minutes was 0.10 inch.

*Example 6*

80 parts of Formvar resin such as described above and 80 parts of methyl phthalate were compounded on malaxating rolls as described under Example 1. To this colloidalized resin plastic mass was added 270 parts of rouge and 90 parts of Lakeland clay and the milling operation carried out until the combination of fillers were thoroughly dispersed throughout the plasticized resin mass. The temperatures employed in carrying out the milling operation were, however, slightly higher (approximately 250° F.) than those employed in preparing the material of Example 1. After dispersion was complete, the plastic mass was removed from the rolls as described in Example 1 and gaskets cut from the material for testing. When tested as described under Example 1, a satisfactory seal was obtained and the contents of the container were not adversely affected from the standpoint of taste or odor.

Flow of this material in the Olsen flow tester at a temperature of 240° F. and a pressure of 200 pounds per square inch for a period of 2 minutes was 0.23 inch.

*Example 7*

100 parts of Alvar resin such as described above were compounded with 60 parts of dibutyl phthalate, 80 parts of clay and 240 parts of rouge in the manner set forth under Example 1. Tested at 250° F. in an autoclave as a gasket material for an all glass container of the type shown in Fig. 2 of the drawing, this material gave an excellent seal and did not contaminate the contents of the container.

Flow of this material in the Olsen flow tester at a temperature of 240° F. and a pressure of 200 pounds per square inch for a period of 2 minutes was 0.18 inch.

It is to be understood that throughout the specification and claims where the amounts of the various ingredients are specified as "parts" it is to be interpreted as meaning "parts by weight" of the different materials.

The examples described above constitute only a few of a large number of materials actually made and tested by me in accordance with the procedure outlined under Example 1. In addition to the above examples, variations were made in the methods of compounding including wide ranges of composition as well as variations in temperatures, pressures, etc. Therefore, while numerous other examples of suitable compositions could be cited they have been omitted and Examples 1 to 7 selected as being typical of the results obtained when using the various types of resins, plasticizers and fillers set forth hereinabove.

Based on the results of the large number of experiments and tests which I have conducted, I would recommend the use of a gasket material having relatively low flowability characteristics, such as in Example 5, for making vertical or side seals of the type shown in Fig. 3 of the drawing. This material is characterized by the necessary rigidity required for use in this particular type of closure wherein relatively higher temperatures are employed in commercial packing and where the gasketing material must remain under water during the entire cooking operation. On the other hand, I would recommend the material of Example 1 for home packing vegetables and fruits since it is somewhat less rigid and has a greater flowability at 240° F., thereby rendering it more suitable for use at the lower temperatures (say 212° F.) normally employed in home packing.

It will also be understood that a considerable departure may be made from the proportions outlined in Examples 1 to 7 in compounding gasketing materials suitable for other uses in the packing art. To illustrate, where a relatively soft resilient material is desired, say for packing chilli sauce or catsup where the final seal may be made at room temperature, the amount of filler should preferably not exceed about 50 parts to 100 parts of plasticized resin. I have found that the plasticizer content can range from 25 parts upwards to 200 parts of plasticizer to 100 parts of resin to give greater elasticity and resiliency, keeping the ratio of filler to plasticized resin constant.

In general, as the amount of plasticizer in the gasket material is increased and the ratio of the resin and filler maintained constant, materials are obtained which show increased flow under heat and pressure and which are characterized by greater softness and resiliency at room temperature. However, if the plasticizer content is increased much above 200 parts to 100 parts of the resin, the tensile strength of the materials decreases to a point where the materials are relatively undesirable.

Further, if the ratio of resin and plasticizer is kept constant and the amount of filler is increased, flowability under heat and pressure decreases proportionately. In general, amounts of filler exceeding 400 parts to 100 parts of plasticized resin should not be used since the materials tend to become too brittle.

I have further found that not all fillers have the same effect on the hardness and flow properties of the gaskets when used in the same ratio to the quantity of plasticized resin. For example, note the flow characteristics of Example 1 and Example 5, where the ratio of the fillers to the resin is constant and the plasticizer ratio to the resin is likewise constant. These data, as well as others, show that as the type of filler used changes, the flowability of the plastic materials varies considerably. In some cases, as in Example 5, it is desirable to add a combination of fillers since by so doing the total amount of filler to plasticized resin may be kept lower and still obtain low flow properties (note Examples 3 and 5). In general, the lower the ratio of filler to plasticized resin, the softer and more resilient the materials. For instance, the material of Example 5 is considerably softer and more resilient than the material of Example 3.

I claim:

1. A thermoplastic gasket for use between the body and closure of a container to seal the joint therebetween, comprising a ring formed from 100 parts of a polyvinyl acetal resin in which at least 60% of the available hydroxyl groups of the partially or wholly hydrolyzed polyvinyl ester are reacted with the aldehyde, approximately 37 parts of a high boiling point low vapor pressure hydrolysis resisting plasticizer compatible with said resin and, for each 100 parts of combined resin and plasticizer, 250 to 400 parts of finely divided filler uniformly dispersed throughout the plasticized resin.

2. A gasket for use in obtaining a tight joint or seal between two parts, comprising a ring formed from 100 parts of a polyvinyl acetal resin in which at least 60% of the available hydroxyl groups of the partially or wholly hydrolyzed polyvinyl ester are reacted with the aldehyde, 37 to 100 parts of a high boiling point low vapor pressure hydrolysis resisting plasticizer compatible with said resin and, for each 100 parts of combined resin and plasticizer, 250 to 400 parts of finely divided filler uniformly dispersed throughout the plasticized resin.

3. A rubber-like thermoplastic material, comprising 100 parts of a polyvinyl acetal resin in which at least 60% of the available hydroxyl groups of the partially or wholly hydrolyzed polyvinyl ester are reacted with the aldehyde, approximately 37 parts of a high boiling point low vapor pressure hydrolysis resisting plasticizer compatible with said resin and, for each 100 parts of combined resin and plasticizer, 250 to 400 parts of finely divided filler uniformly dispersed throughout the plasticized resin.

4. A rubber-like thermoplastic material, comprising 100 parts of a polyvinyl acetal resin in which at least 60% of the available hydroxyl groups of the partially or wholly hydrolyzed polyvinyl ester are reacted with the aldehyde, 37 to 100 parts of a high boiling point low vapor pressure hydrolysis resisting plasticizer compatible with said resin and, for each 100 parts of combined resin and plasticizer, 250 to 400 parts of finely divided filler uniformly dispersed throughout the plasticized resin.

JOSEPH D. RYAN.